United States Patent [19]
Tsuji et al.

[11] Patent Number: 6,009,226
[45] Date of Patent: Dec. 28, 1999

[54] RECORDING AND REPRODUCING APPARATUS FOR PACKET DATA

[75] Inventors: Yoshinobu Tsuji; Takeo Ohishi; Mitsuo Harumatsu, all of Yokohama, Japan

[73] Assignee: Victor Company of Japan, Ltd., Yokohama, Japan

[21] Appl. No.: 08/850,015

[22] Filed: May 1, 1997

[30] Foreign Application Priority Data

May 8, 1996 [JP] Japan ..................................... 8-139651

[51] Int. Cl.$^6$ ............................... H04N 5/91; H04N 5/95
[52] U.S. Cl. .................................. 386/46; 386/85; 386/95
[58] Field of Search ............................ 386/46, 109, 111, 386/112, 96, 113, 83–95, 85, 13; 360/32; H04N 5/91, 5/95

[56] References Cited

U.S. PATENT DOCUMENTS

5,502,573 3/1996 Fujinami .................................. 386/109
5,703,997 12/1997 Kitamura et al. ......................... 386/97

*Primary Examiner*—Robert Chevalier
*Attorney, Agent, or Firm*—Pollock, Vande Sande & Amernick

[57] ABSTRACT

In a recording and reproducing apparatus, time stamps are generated which represent moments of arrival of sequentially-inputted packets of data respectively. The generated time stamps are added to the sequentially-inputted packets respectively, and thereby the sequentially-inputted packets are converted into second packets respectively. The second packets are recorded on a recording medium. The second packets are sequentially reproduced from the recording medium. The time stamps in the respective reproduced second packets are detected. A detection is made as to whether each of the detected time stamps is correct or wrong. When a wrong time stamp is detected, a reproduced second packet is discarded which relates to the detected wrong time stamp.

20 Claims, 5 Drawing Sheets

RECORDING AND REPRODUCING APPARATUS FOR PACKET DATA

BACKGROUND OF THE INVENTION

1. Field of the Invention

This invention relates to an apparatus for recording and reproducing packet data on and from a recording medium such as a magnetic recording medium. Also, this invention relates to an apparatus for reproducing packet data from a recording medium such as a magnetic recording medium.

2. Description of the Related Art

A digital satellite system (DSS) and a digital video broadcasting (DVB) system are examples of digital transmission systems. The DSS sends a stream of packets of digital data representing a plurality of programs multiplexed on a time-division basis. Also, the DVB system sends a stream of packets of digital data representing a plurality of programs multiplexed on a time-division basis. The digital data handled by the DVB system is of a predetermined format conforming to MPEG2. Here, MPEG2 is short for "Moving Picture Image Coding Experts Group Phase 2".

In such digital transmission systems, packets sequentially transported from a transmission side represent programs and also identification information pieces for accurate recovery of the programs. In a reception side, the identification information pieces are extracted from a received transport stream of packets, and the programs are recovered from the transport stream of packets in response to the identification information pieces.

There is a known apparatus for recording and reproducing a digital signal on and from a magnetic tape sync-block by sync-block. In this known apparatus, an input digital signal representing a program or programs is divided into sync blocks which are sequentially recorded.

Also, there is a known apparatus for recording and reproducing a transport stream of packets of digital data on and from a magnetic tape. This known apparatus includes a counter outputting a signal representing local reference time which starts from an initial value at start of each recording process or each playback process. During a recording process, the output signal of the local-reference-time counter which occurs at reception of every packet in an input transport stream is added to the packet as a time stamp. Packets including respective time stamps undergo given signal processing before being recorded on the magnetic tape. In this known apparatus, during a playback process, packets reproduced from the magnetic tape are sequentially stored into a buffer memory. The reproduced packets are sequentially read out from the buffer memory. The reproduced packets read out from the buffer memory compose an output transport stream. A time stamp in every reproduced packet is detected. The detected time stamp is compared with the output signal of the local-reference-time counter. When the output signal of the local-reference-time counter comes into agreement with the detected time stamp, reading the related packet from the buffer memory is implemented. This timing control enables the output transport stream to be equal to the input transport stream in packet order and time intervals between packets.

SUMMARY OF THE INVENTION

It is an object of this invention to provide an improved recording and reproducing apparatus for packet data.

It is another object of this invention to provide an improved reproducing apparatus for packet data.

A first aspect of this invention provides an apparatus for recording and reproducing packet data on and from a recording medium which comprises first means for generating time stamps representing moments of arrival of sequentially-inputted packets of data respectively; second means for adding the time stamps generated by the first means to the sequentially-inputted packets respectively, and thereby converting the sequentially-inputted packets into second packets respectively; third means for recording the second packets generated by the second means on the recording medium; fourth means for sequentially reproducing the second packets from the recording medium; fifth means for detecting the time stamps in the respective second packets reproduced by the fourth means; sixth means for detecting whether each of the time stamps detected by the fifth means is correct or wrong; and seventh means for, when the sixth means detects a wrong time stamp, discarding a second packet which is reproduced by the fourth means and which relates to the wrong time stamp detected by the sixth means.

A second aspect of this invention is based on the first aspect thereof, and provides an apparatus wherein the sixth means comprises means for selecting a plurality of successively-occurring time stamps from among the time stamps detected by the fifth means, the selected time stamps containing a time stamp of interest; means for comparing the selected time stamps with each other; and means for deciding whether or not the time stamp of interest is correct or wrong in response to a result of the comparison between the selected time stamps.

A third aspect of this invention is based on the first aspect thereof, and provides an apparatus wherein the seventh means comprises a buffer memory for sequentially storing the second packets reproduced by the fourth means, and for sequentially outputting the stored second packets; and means for inhibiting the buffer memory from outputting a second packet which relates to the wrong time stamp detected by the sixth means.

A fourth aspect of this invention is based on the first aspect thereof, and provides an apparatus wherein the seventh means comprises a switch connected between the fourth means and a transmission line and connected to the sixth means for inhibiting a second packet, which is reproduced by the fourth means and which relates to the wrong time stamp detected by the sixth means, from traveling to the transmission line.

A fifth aspect of this invention provides an apparatus for recording and reproducing packet data on and from a recording medium which comprises first means for generating time stamps representing moments of arrival of sequentially-inputted packets of data respectively; second means for adding the time stamps generated by the first means to the sequentially-inputted packets respectively, and thereby converting the sequentially-inputted packets into second packets respectively; third means for recording the second packets generated by the second means on the recording medium; fourth means for sequentially reproducing the second packets from the recording medium; fifth means for detecting the time stamps in the respective second packets reproduced by the fourth means; sixth means for detecting whether each of the time stamps detected by the fifth means is correct or wrong; and seventh means for, when the sixth means detects a wrong time stamp, generating given information and adding the generated information to a second packet which is reproduced by the fourth means and which relates to the wrong time stamp detected by the sixth means, the added information representing that the time stamp of the related second packet is wrong.

A sixth aspect of this invention is based on the fifth aspect thereof, and provides an apparatus wherein the sixth means comprises means for selecting a plurality of successively-occurring time stamps from among the time stamps detected by the fifth means, the selected time stamps containing a time stamp of interest; means for comparing the selected time stamps with each other; and means for deciding whether or not the time stamp of interest is correct or wrong in response to a result of the comparison between the selected time stamps.

A seventh aspect of this invention provides an apparatus for reproducing packet data from a recording medium which comprises first means for sequentially reproducing packets of data from the recording medium; second means for detecting time stamps in the respective packets reproduced by the first means: third means for detecting whether each of the time stamps detected by the second means is correct or wrong: and fourth means for, when the third means detects a wrong time stamp, discarding a packet which is reproduced by the first means and which relates to the wrong time stamp detected by the third means.

An eighth aspect of this invention is based on the seventh aspect thereof, and provides an apparatus wherein the third means comprises means for selecting a plurality of successively-occurring time stamps from among the time stamps detected by the second means, the selected time stamps containing a time stamp of interest; means for comparing the selected time stamps with each other; and means for deciding whether or not the time stamp of interest is correct or wrong in response to a result of the comparison between the selected time stamps.

A ninth aspect of this invention is based on the seventh aspect thereof, and provides an apparatus wherein the fourth means comprises a buffer memory for sequentially storing the packets reproduced by the first means, and for sequentially outputting the stored packets; and means for inhibiting the buffer memory from outputting a packet which relates to the wrong time stamp detected by the third means.

A tenth aspect of this invention is based on the seventh aspect thereof, and provides an apparatus wherein the fourth means comprises a switch connected between the first means and a transmission line and connected to the third means for inhibiting a packet, which is reproduced by the first means and which relates to the wrong time stamp detected by the third means, from traveling to the transmission line.

An eleventh aspect of this invention provides an apparatus for reproducing packet data from a recording medium which comprises first means for sequentially reproducing packets of data from the recording medium; second means for detecting time stamps in the respective packets reproduced by the first means; third means for detecting whether each of the time stamps detected by the second means is correct or wrong; and fourth means for, when the third means detects a wrong time stamp, generating given information and adding the generated information to a packet which is reproduced by the first means and which relates to the wrong time stamp detected by the third means, the added information representing that the time stamp of the related packet is wrong.

A twelfth aspect of this invention is based on the eleventh aspect thereof, and provides an apparatus wherein the third means comprises means for selecting a plurality of successively-occurring time stamps from among the time stamps detected by the second means, the selected time stamps containing a time stamp of interest; means for comparing the selected time stamps with each other; and means for deciding whether or not the time stamp of interest is correct or wrong in response to a result of the comparison between the selected time stamps.

DESCRIPTION OF THE PREFERRED EMBODIMENTS

A prior-art recording and reproducing apparatus will be explained for a better understanding of this invention.

Figure 1:
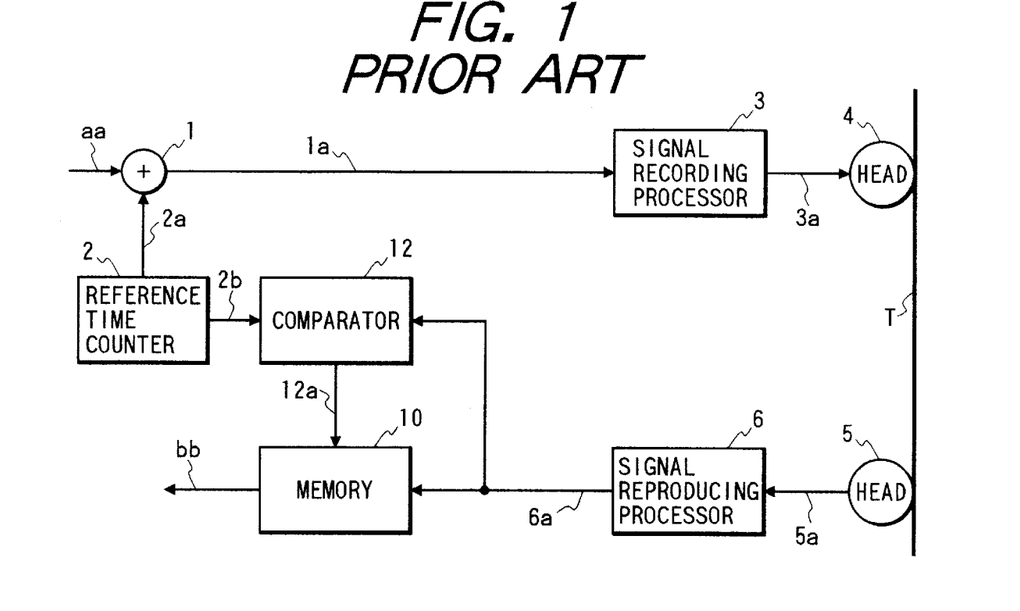
FIG. 1 is a block diagram of a prior-art recording and reproducing apparatus.

FIG. 1 shows a prior-art recording and reproducing apparatus which includes an adder 1. During a recording process, a steam "aa" of packets of digital data is inputted into the adder 1 from a transmission line (not shown).

In the prior-art apparatus of FIG. 1, a counter 2 outputs a signal 2a representing local reference time which starts from an initial value at start of each recording process. Generally, the local-reference-time counter 2 responds to pulses of a high-frequency clock signal. During the recording process, the output signal 2a of the local-reference-time counter 2 is applied to the adder 1.

The adder 1 adds the output signal 2a of the local-reference-time counter 2 to every packet in the input stream "aa" as a time stamp representing the moment of the arrival of the packet. Thus, the adder 1 generates a stream 1a of packets including respective time stamps. The adder 1 outputs the packet stream 1a to a signal recording processor 3.

The signal recording processor 3 subjects the packet stream 1a to given signal processing such as shuffling, encoding for error correction, and modulation. Thereby, the signal recording processor 3 converts the packet stream 1a into a processing-resultant signal 3a. The signal recording processor 3 outputs the processing-resultant signal 3a to a magnetic head 4.

The magnetic head 4 records the processing-resultant signal 3a on a magnetic tape "T". For example, the magnetic head 4 is mounted on a rotary drum, and the magnetic tape "T" is wrapped on the rotary drum. During the recording of the processing-resultant signal 3a on the magnetic tape "T", the magnetic head 4 scans the magnetic tape "T" while forming tracks of a given pattern thereon.

In the prior-art apparatus of FIG. 1, during a playback process, a magnetic head 5 scans tracks on the magnetic tape "T", and reproduces a signal 5a therefrom. For example, the magnetic head 5 is mounted on the rotary drum. The magnetic head 5 outputs the reproduced signal 5*a* to a signal reproducing processor 6.

The signal reproducing processor 6 subjects the reproduced signal 5*a* to given signal processing inverse and complementary with respect to the signal processing implemented by the signal recording processor 3. Thereby, the signal reproducing processor 6 converts the reproduced signal 5*a* into a stream 6*a* of packets of recovered digital data. Packets in the stream 6*a* include time stamps respectively. The signal reproducing processor 6 outputs the packet stream 6*a* to a buffer memory 10 and a comparator 12. The packet stream 6*a* corresponds to the packet stream 1*a* which occurs during a recording process. Packets in the stream 6*a* are sequentially stored into the buffer memory 10.

In the prior-art apparatus of FIG. 1, the local-reference-time counter 2 outputs a signal 2*b* representing local reference time which starts from an initial value at start of each playback process. Generally, the local-reference-time counter 2 responds to pulses of a high-frequency clock signal. During the playback process, the output signal 2*b* of the local-reference-time counter 2 is applied to the comparator 12.

The comparator 12 compares the time stamp of every packet in the stream 6*a* with the output signal 2*b* of the local-reference-time counter 2. When the output signal 2*b* of the local-reference-time counter 2 comes into agreement with the time stamp of a packet in the stream 6*a*, the comparator 12 outputs a read enabling signal 12*a* to the buffer memory 10 so that the packet is read out from the buffer memory 10. Packets sequentially read out from the buffer memory 10 compose an output stream "bb" corresponding to the input stream "aa". The output steam "bb" of packets of recovered digital data is transmitted from the buffer memory 10.

In the prior-art apparatus of FIG. 1, if an uncorrectable error occurs in a time stamp of a packet, the output packet stream "bb" tends to be wrong in packet order and time intervals between packets during a playback process.

First Embodiment

Figure 2:
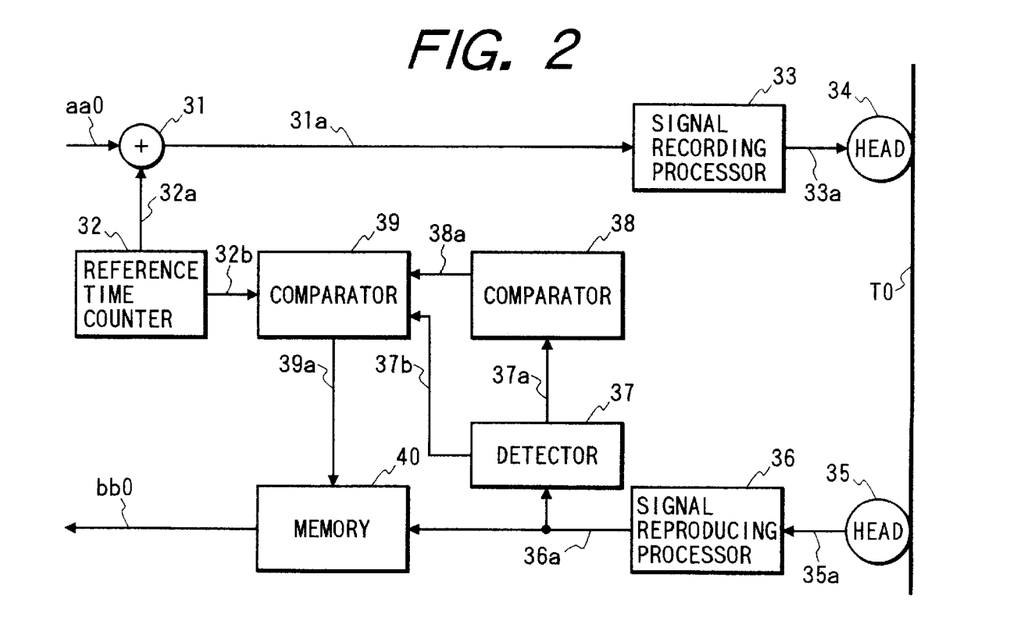
FIG. 2 is a block diagram of a recording and reproducing apparatus according to a first embodiment of this invention.

FIG. 2 shows a recording and reproducing apparatus according to a first embodiment of this invention. The recording and reproducing apparatus of FIG. 2 includes an adder 31, a counter 32, a signal recording processor 33, magnetic heads 34 and 35, a signal reproducing processor 36, a detector 37, comparators 38 and 39, and a buffer memory 40.

As shown in FIG. 2, the adder 31 is connected to the counter 32 and the signal recording processor 33. The signal recording processor 33 is connected to the magnetic head 34. The magnetic head 35 is connected to the signal reproducing processor 36. The signal reproducing processor 36 is connected to the detector 37 and the buffer memory 40. The detector 37 is connected to the comparators 38 and 39. The comparator 38 is connected to the comparator 39. The comparator 39 is connected to the counter 32 and the buffer memory 40.

In the recording and reproducing apparatus of FIG. 2, during a recording process, a stream "aa0" of packets of digital data is inputted into the adder 31 from a transmission line (not shown). Packets in the input stream "aa0" arrive at, for example, equal intervals.

The counter 32 outputs a signal 32*a* representing local reference time which starts from an initial value at start of each recording process. Generally, the local-reference-time counter 32 responds to pulses of a high-frequency clock signal. During the recording process, the output signal 32*a* of the local-reference-time counter 32 is applied to the adder 31.

The adder 31 adds the output signal 32*a* of the local-reference-time counter 32 to every packet in the input stream "aa0" as a time stamp representing the moment of the arrival of the packet. Thus, the adder 31 generates a stream 31*a* of packets including respective time stamps. The adder 31 outputs the packet stream 31*a* to the signal recording processor 33.

In the recording and reproducing apparatus of FIG. 2, the signal recording processor 33 subjects the packet stream 31*a* to given signal processing such as shuffling, encoding for error correction, and modulation. Thereby, the signal recording processor 33 converts the packet stream 31*a* into a processing-resultant signal 33*a*. The signal recording processor 33 outputs the processing-resultant signal 33*a* to the magnetic head 34.

The magnetic head 34 records the processing-resultant signal 33*a* on a magnetic tape "T0". For example, the magnetic head 34 is mounted on a rotary drum, and the magnetic tape "T0" is wrapped on the rotary drum. During the recording of the processing-resultant signal 33*a* on the magnetic tape "T0", the magnetic head 34 scans the magnetic tape "T0" while forming tracks of a given pattern thereon.

In the recording and reproducing apparatus of FIG. 2, during a playback process, the magnetic head 35 scans tracks on the magnetic tape "T0", and reproduces a signal 35*a* therefrom. For example, the magnetic head 35 is mounted on the rotary drum. The magnetic head 35 outputs the reproduced signal 35*a* to the signal reproducing processor 36.

It should be noted that a common magnetic head may be used as the magnetic heads 34 and 35.

The signal reproducing processor 36 subjects the reproduced signal 35*a* to given signal processing inverse and complementary with respect to the signal processing implemented by the signal recording processor 33. Thereby, the signal reproducing processor 36 converts the reproduced signal 35*a* into a stream 36*a* of packets of recovered digital data. Packets in the stream 36*a* include time stamps respectively. The signal reproducing processor 36 outputs the packet stream 36*a* to the detector 37 and the buffer memory 40. The packet stream 36*a* corresponds to the packet stream 31*a* which occurs during a recording process.

Packets in the stream 36*a* are sequentially stored into the buffer memory 40. Specifically, the buffer memory 40 has two sub memories each corresponding in capacity to one packet. Packets in the stream 36*a* are alternately written into the two sub memories. In each of the two sub memories, when a new packet comes, a stored packet is replaced by the new packet. Generally, one of the two sub memories is subjected to a packet writing process while the other sub memory is subjected to a packet reading process.

The detector 37 has a main section for extracting a time stamp 37*b* from every packet in the stream 36*a*. The detector 37 outputs the extracted time stamp 37*b* to the comparator 39 as a time stamp of interest. The detector 37 includes a plurality of registers into which extracted time stamps are sequentially and cyclically written. In each of the registers, when a new time stamp comes, a stored time stamp is replaced by the new time stamp. Thus, the registers store time stamps extracted from a plurality of successive packets respectively. The detector 37 outputs a signal 37*a* to the comparator 38 which represents the time stamps stored in the respective registers.

For example, the detector 37 has two registers into which extracted time stamps are alternately written. In each of the two registers, when a new time stamp comes, a stored time stamp is replaced by the new time stamp. Thus, the two registers store time stamps extracted from two successive packets respectively. One of the two registers is assigned to time stamps related to even-numbered packets while the other register is assigned to time stamps related to odd-numbered packets. In this case, the output signal 37a of the detector 37 represents a time stamp of interest and an immediately-preceding time stamp.

The comparator 38 compares the time stamps, represented by the output signal 37a of the detector 37, to decide whether or not the time stamps are in a predetermined normal relation. This decision is to detect an error of a time stamp of interest or to determine whether or not the time stamp of interest is correct or wrong. When the comparator 38 decides that the time stamps are in the predetermined normal relation, that is, when the comparator 38 determines that the time stamp of interest is correct, the comparator 38 outputs an enabling control signal (for example, a low-level signal) 38a to the comparator 39. When the comparator 38 decides that the time stamps are not in the predetermined normal relation, that is, when the comparator 38 determines that the time stamp of interest is wrong, the comparator 38 outputs a disabling control signal (for example, a high-level signal) 38a to the comparator 39.

In the recording and reproducing apparatus of FIG. 2, the local-reference-time counter 32 outputs a signal 32b representing local reference time which starts from an initial value at start of each playback process. Generally, the local-reference-time counter 32 responds to pulses of a high-frequency clock signal. During the playback process, the output signal 32b of the local-reference-time counter 32 is applied to the comparator 39.

The comparator 39 compares the time stamp 37b of interest with the output signal 32b of the local-reference-time counter 32. In the case where the enabling control signal 38a is fed from the comparator 38, when the output signal 32b of the local-reference-time counter 32 comes into agreement with the time stamp 37b of interest, the comparator 39 outputs a read enabling signal 39a to the buffer memory 40 so that a packet related to the time stamp 37b of interest is read out from the buffer memory 40. On the other hand, in the case where the disabling control signal 38a is fed from the comparator 38, even when the output signal 32b of the local-reference-time counter 32 comes into agreement with the time stamp 37b of interest, the comparator 39 does not output a read enabling signal 39a to the buffer memory 40 so that a packet related to the time stamp 37b of interest is not read out from the buffer memory 40.

Thus, packets having correct time stamps are read out from the buffer memory 40 while packets having wrong time stamps are inhibited from being read out from the buffer memory 40. In this way, packets having wrong time stamps are discarded. Packets sequentially read out from the buffer memory 40 compose an output stream "bb0" corresponding to the input stream "aa0". The output steam "bb0" of packets of recovered digital data is fed from the buffer memory 40 to a transmission line (not shown).

Generally, a suitable delay device is connected between the detector 37 and the comparator 39 to provide timing matching between the time stamp 37b of interest and the output signal 32b of the counter 32. It is preferable that a suitable delay device immediately precedes the buffer memory 40 to provide timing matching between packets stored in the buffer memory 40 and the read enabling signal 39a outputted from the comparator 39.

Figure 3:
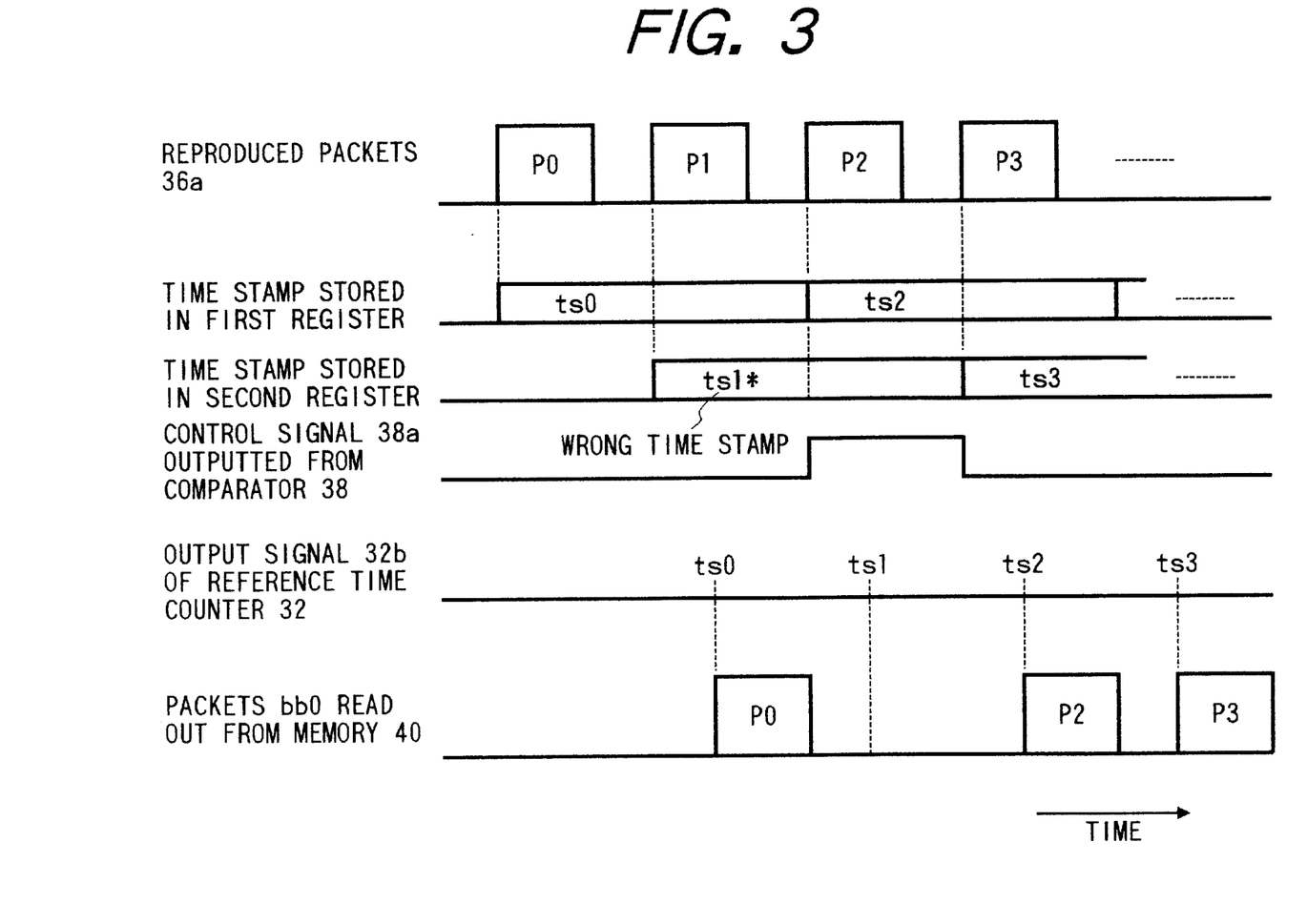
FIG. 3 is a time-domain diagram of various signals in the apparatus of FIG. 2.

With reference to FIG. 3, during a playback process, successive packets P0, P1, P2, P3, . . . in the steam 36a have time stamps ts0, ts1, ts2, ts3, . . . respectively. It is assumed that the time stamp ts1 of the packet P1 is wrong while the time stamps ts0, ts2, and ts3 of the packets P0, P2, and P3 are correct. As shown in FIG. 3, the first register In the detector 37 is sequentially loaded with the time stamps ts0, ts2, . . . while the second register in the detector 37 is sequentially loaded with the time stamps ts1, ts3, . . . When the wrong time stamp ts1 is detected by the comparator 38, the control signal 38a outputted from the comparator 38 to the comparator 39 changes from a low level to a high level as shown in FIG. 3. The high-level control signal (the disabling control signal) 38a inhibits the reading of the packet P1 with the wrong time stamp ts1 from the buffer memory 40. On the other hand, the packets P0, P2, and P3 with the correct time stamps ts0, ts2, and ts3 are read out from the buffer memory 40 at normal timings determined by the output signal 32b of the counter 32.

Figure 4:
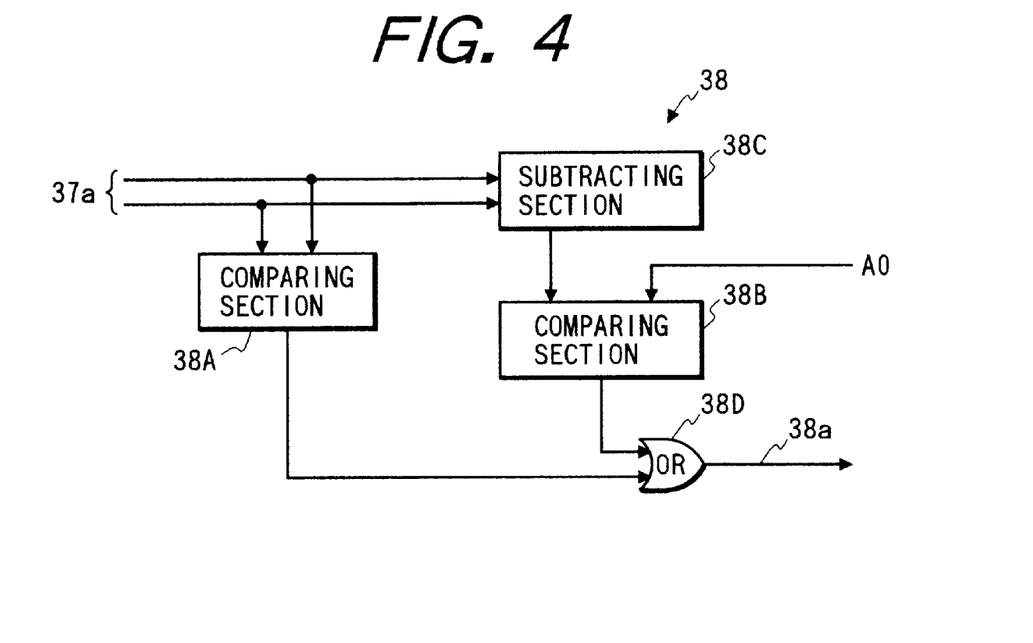
FIG. 4 is a block diagram of an example of a first comparator in FIG. 2.

FIG. 4 shows an example of the comparator 38. As shown in FIG. 4, the comparator 38 includes comparing sections 38A and 38B, a subtracting section 38C, and an OR gate 38D. The output signal 37a of the detector 37, which represents a time stamp of interest and an immediately-preceding time stamp, is applied to the comparing section 38A and the subtracting section 38C. The comparing section 38A decides whether or not the time stamp of interest is smaller than the immediately-preceding time stamp. When the time stamp of interest is smaller than the immediately-preceding time stamp, the comparing section 38A outputs a high-level signal to the OR gate 38D as an indication of the presence of an error in the time stamp of interest. Otherwise, the comparing section 38A outputs a low-level signal to the OR gate 38D. The subtracting section 38C subtracts the immediately-preceding time stamp from the time stamp of interest. The subtracting section 38C informs the comparing section 38B of the subtraction result, that is, the difference between the time stamp of interest and the immediately-preceding time stamp. A fixed signal representing a predetermined positive reference value A0 is applied to the comparing section 38B. The fixed signal is generated by, for example, a ROM. The reference value A0 is greater than normal time intervals between packets. The comparing section 38B decides whether or not the time-stamp difference is greater than the reference value A0. When the time-stamp difference is greater than the reference value A0, the comparing section 38B outputs a high-level signal to the OR gate 38D as an indication of the presence of an error in the time stamp of interest. Otherwise, the comparing section 38B outputs a low-level signal to the OR gate 38D. The OR gate 38D executes logic OR operation between the output signals of the comparing sections 38A and 38B, thereby generating the control signal 38a. As previously explained, the control signal 38a is outputted from the comparator 38 to the comparator 39.

Figure 5:
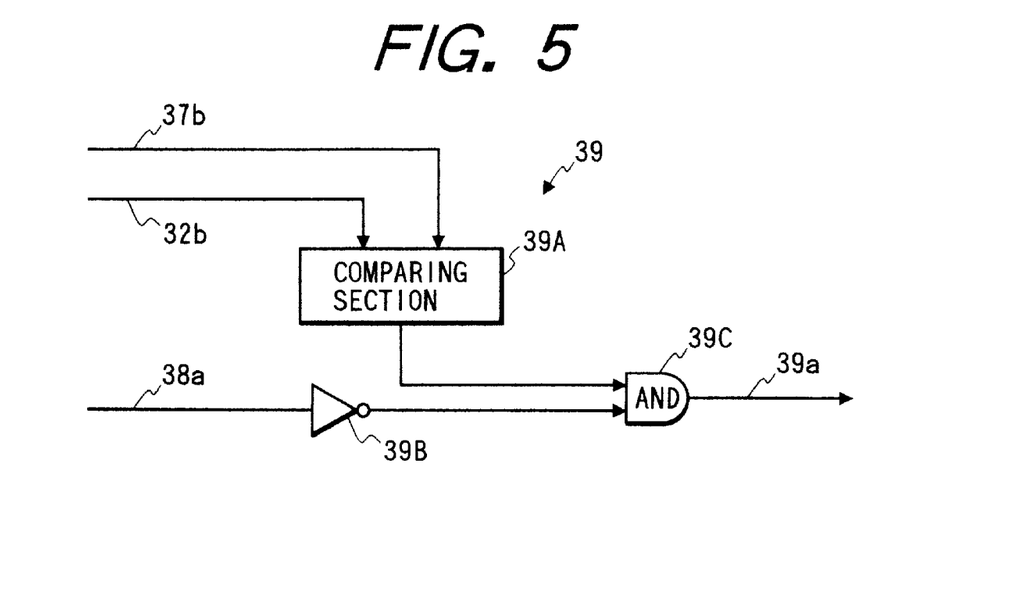
FIG. 5 is a block diagram of an example of a second comparator in FIG. 2.

FIG. 5 shows a first example of the comparator 39. As shown in FIG. 5, the comparator 39 includes a comparing section 39A, an inverter 39B, and an AND gate 39C. The output signal 32b of the local-reference-time counter 32, which represents local reference time, is applied to the comparing section 39A. The output signal 37b of the detector 37, which represents a time stamp of interest, is applied to the comparing section 39A. The comparing section 39A decides whether or not the local reference time is equal to the time stamp of interest. When the local reference time is equal to the time stamp of interest, the comparing section 39A outputs a high-level signal to the AND gate 39C. Otherwise, the comparing section 39A outputs a low-level signal to the AND gate 39C. The output signal (the enabling control signal or the disabling control signal) 38a of the comparator 38 is applied to the inverter 39B. The inverter 39B outputs an inversion of the output signal 38a of the comparator 38 to the AND gate 39C. When the output signal 38a of the comparator 38 is in a high-level state, that is, when the disabling control signal 38a is present, the AND gate 39C is closed by the output signal of the inverter 39B. Thus, in this case, the AND gate 39C continues to output a low-level signal. When the output signal 38a of the comparator 38 is in a low-level state, that is, when the enabling control signal 38a is present, the AND gate 39C is opened by the output signal of the inverter 39B. Thus, in this case, the output signal of the comparing section 39A can be transmitted through the AND gate 39C. Accordingly, in this case, the high-level output signal of the comparing section 39A, which occurs when the local reference time becomes equal to the time stamp of interest, is transmitted through the AND gate 39C and is used as the read enabling signal 39a.

Figure 6:
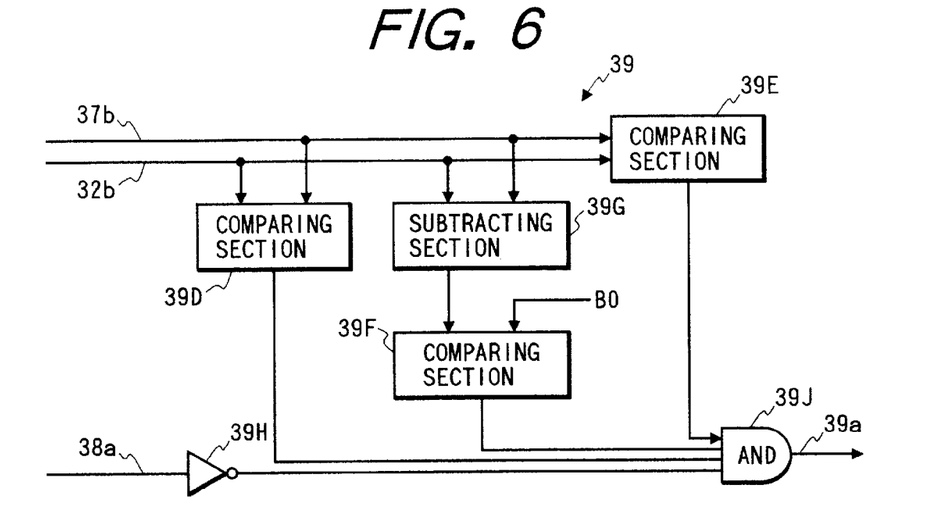
FIG. 6 is a block diagram of another example of the second comparator in FIG. 2.

FIG. 6 shows a second example of the comparator 39 which has an error detecting function. As shown in FIG. 6, the comparator 39 includes comparing sections 39D, 39E, and 39F, a subtracting section 39G, an inverter 39H, and an AND gate 39J. The output signal 32b of the local-reference-time counter 32, which represents local reference time, is applied to the comparing sections 39D and 39E and the subtracting section 39G. The output signal 37b of the detector 37, which represents a time stamp of interest, is applied to the comparing sections 39D and 39E and the subtracting section 39G. The comparing section 39D decides whether or not the time stamp of interest is smaller than the value of the local reference time. When the time stamp of interest is smaller than the value of the local reference time, the comparing section 39D outputs a low-level signal to the AND gate 39J as an indication of the presence of an error in the time stamp of interest. Otherwise, the comparing section 39D outputs a high-level signal to the AND gate 39J. The subtracting section 39G subtracts the value of the local reference time from the time stamp of interest. The subtracting section 39G informs the comparing section 39F of the subtraction result, that is, the difference between the time stamp of interest and the value of the local reference time. A fixed signal representing a predetermined positive reference value B0 is applied to the comparing section 39F. The fixed signal is generated by, for example, a ROM. The reference value B0 is greater than normal time intervals between packets. The comparing section 39F decides whether or not the subtraction result is greater than the reference value B0. When the subtraction result is greater than the reference value B0, the comparing section 39F outputs a low-level signal to the AND gate 39J as an indication of the presence of an error in the time stamp of interest. Otherwise, the comparing section 39F outputs a high-level signal to the AND gate 39J. The comparing section 39E decides whether or not the local reference time is equal to the time stamp of interest. When the local reference time is equal to the time stamp of interest, the comparing section 39E outputs a high-level signal to the AND gate 39J. Otherwise, the comparing section 39E outputs a low-level signal to the AND gate 39J. The output signal (the enabling control signal or the disabling control signal) 38a of the comparator 38 is applied to the inverter 39H. The inverter 39H outputs an inversion of the output signal 38a of the comparator 38 to the AND gate 39J. When the output signal 38a of the comparator 38 is in a high-level state, that is, when the disabling control signal 38a is present, the AND gate 39J is closed by the output signal of the inverter 39H. Thus, in this case, the AND gate 39J continues to output a low-level signal. When at least one of the output signals of the comparing sections 39D and 39F is in a low-level state, that is, when an error is present in the time stamp of interest, the AND gate 39J is closed so that the AND gate 39J continues to output a low-level signal. On the other hand, when the output signal 38a of the comparator 38 is in a low-level state and the output signals of the comparing sections 39D and 39F are in high-level states, that is, when the enabling control signal 38a is present and the time stamp of interest does not have any error, the AND gate 39J is opened by the output signal of the inverter 39H and the output signals of the comparing sections 39D and 39F. Thus, in this case, the output signal of the comparing section 39E can be transmitted through the AND gate 39J. Accordingly, in this case, the high-level output signal of the comparing section 39E, which occurs when the local reference time becomes equal to the time stamp of interest, is transmitted through the AND gate 39J and is used as the read enabling signal 39a.

Second Embodiment

Figure 7:
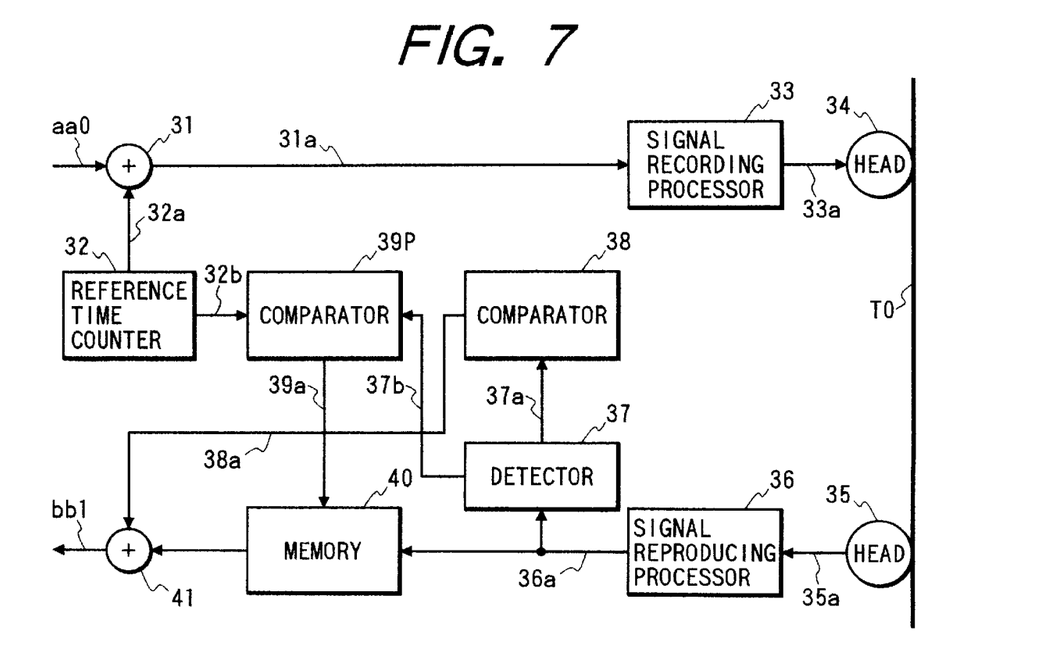
FIG. 7 is a block diagram of a recording and reproducing apparatus according to a second embodiment of this invention.

FIG. 7 shows a second embodiment of this invention which is similar to the embodiment of FIG. 2 except for design changes explained hereinafter. The embodiment of FIG. 7 includes an adder connected to the comparator 38 and the buffer memory 40. The embodiment of FIG. 7 uses a comparator 39P instead of the comparator 39 in FIG. 2.

Figure 8:
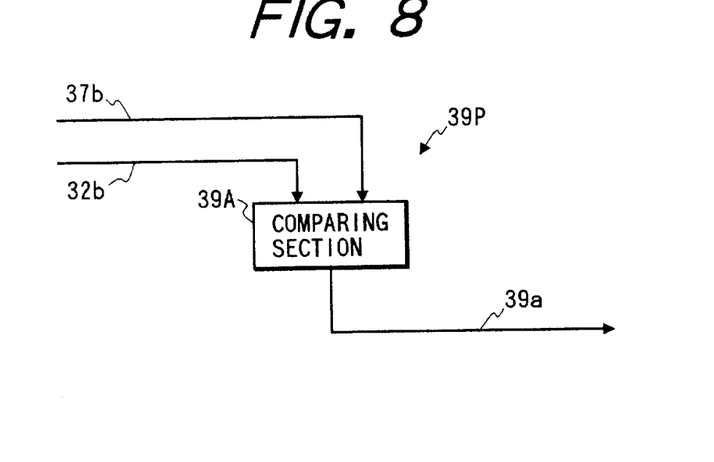
FIG. 8 is a block diagram of a comparator in FIG. 7.

As shown in FIG. 8, the comparator 39P includes a comparing section 39A. The output signal 32b of the local-reference-time counter 32, which represents local reference time, is applied to the comparing section 39A. The output signal 37b of the detector 37, which represents a time stamp of interest, is applied to the comparing section 39A. The comparing section 39A decides whether or not the local reference time Is equal to the time stamp of interest. When the local reference time is equal to the time stamp of interest, the comparing section 39A outputs a high-level signal as the read enabling signal 39a. Otherwise, the comparing section 39A outputs a low-level signal.

In the embodiment of FIG. 7, packets sequentially read out from the buffer memory 40 are fed to the adder 41. The packets travel through the adder 41, and compose an output stream "bb1" corresponding to the input stream "aa0". The output steam "bb1" of packets of recovered digital data is fed from the adder 41 to a transmission line (not shown).

The output signal 38a of the comparator 38 is fed to the adder 41. When the comparator 38 detects a wrong time stamp, the comparator 38 outputs a high-level signal 38a to the adder 41. The adder 41 adds the high-level signal 38a to a packet being read out from the buffer memory 40 and relating to the wrong time stamp. The added high-level signal 38a indicates that the related packet has a wrong time stamp.

Third Embodiment

Figure 9:
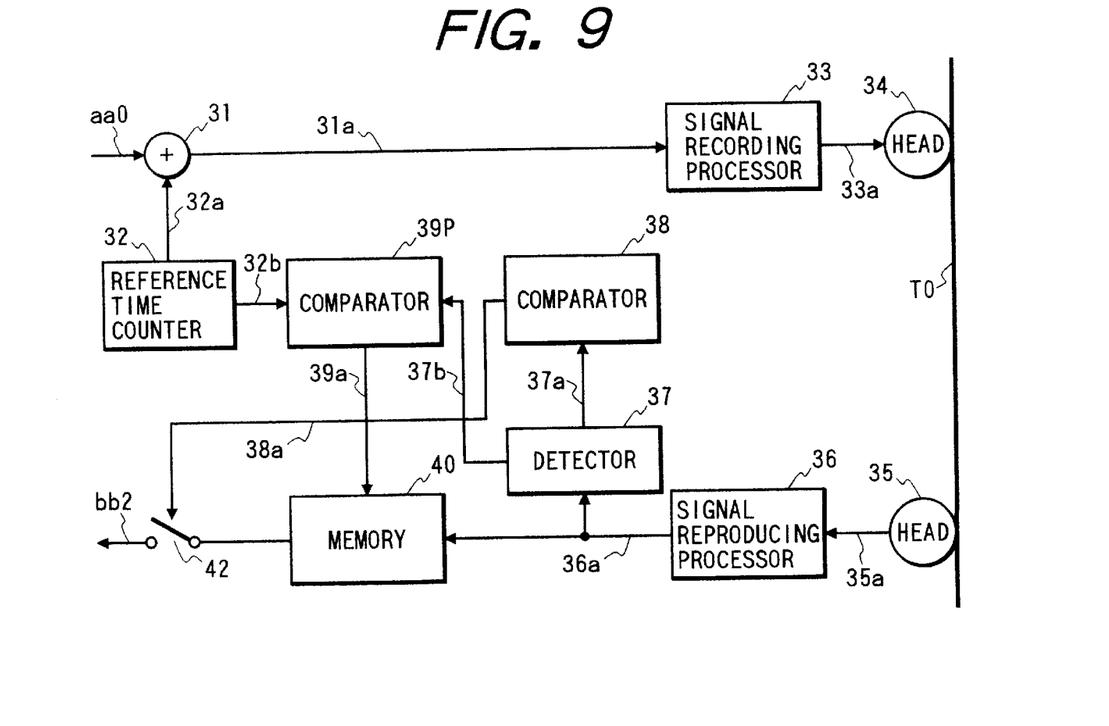
FIG. 9 is a block diagram of a recording and reproducing apparatus according to a third embodiment of this invention.

FIG. 9 shows a third embodiment of this invention which is similar to the embodiment of FIG. 7 except for a design change explained hereinafter. The embodiment of FIG. 9 includes a switch 42 instead of the adder 41 in FIG. 7. The switch 42 is connected to the comparator 38 and the buffer memory 40.

In the embodiment of FIG. 9, packets sequentially read out from the buffer memory 40 are fed to the switch 42. The output signal 38a of the comparator 38 is fed to the switch 42. The switch 42 is closed and opened when the output signal 38a of the comparator 38 assumes a low-level state and a high-level state respectively. In other words, the switch 42 is made conductive and non-conductive when the output signal 38a of the comparator 38 assumes the low-level state and the high-level state respectively.

When the comparator 38 detects a correct time stamp, the comparator 38 outputs a low-level signal 38a to the switch 42 so that the switch 42 is made conductive. Thus, in this case, a packet being read out from the buffer memory 40 and relating to the correct time stamp travels through the switch 42. On the other hand, when the comparator 38 detects a wrong time stamp, the comparator 38 outputs a high-level signal 38a to the switch 42 so that the switch 42 is made non-conductive. Thus, in this case, a packet being read out from the buffer memory 40 and relating to the wrong time stamp is inhibited from traveling through the switch 42. In this way, a packet having a wrong time stamp is discarded.

Packets which have traveled through the switch 42 compose an output stream "bb2" corresponding to the input stream "aa0". The output steam "bb2" of packets of recovered digital data is fed from the switch 42 to a transmission line (not shown).

What is claimed is:

1. An apparatus for recording and reproducing packet data on and from a recording medium, comprising:

first means for generating time stamps representing moments of arrival of sequentially-inputted packets of data respectively;

second means for adding the time stamps generated by the first means to the sequentially-inputted packets respectively, and thereby converting the sequentially-inputted packets into second packets respectively;

third means for recording the second packets generated by the second means on the recording medium;

fourth means for sequentially reproducing the second packets from the recording medium;

fifth means for detecting the time stamps in the respective second packets reproduced by the fourth means;

sixth means for detecting whether each of the time stamps detected by the fifth means is correct or wrong comprising 1) means for selecting a plurality of successively-occurring time stamps from among the time stamps detected by the fifth means, the selected time stamps containing a time stamp of interest; 2) means for comparing the selected time stamps with each other; and 3) means for deciding whether or not the time stamp of interest is correct or wrong in response to a result of the comparison between the selected time stamps; and seventh means for, when the sixth means detects a wrong time stamp, discarding a second packet which is reproduced by the fourth means and which relates to the wrong time stamp detected by the sixth means.

2. The apparatus of claim 1, wherein the seventh means comprises:

a buffer memory for sequentially storing the second packets reproduced by the fourth means, and for sequentially outputting the stored second packets; and means for inhibiting the buffer memory from outputting a second packet which relates to the wrong time stamp detected by the sixth means.

3. The apparatus of claim 1, wherein the seventh means comprises a switch connected between the fourth means and a transmission line and connected to the sixth means for inhibiting a second packet, which is reproduced by the fourth means and which relates to the wrong time stamp detected by the sixth means, from traveling to the transmission line.

4. An apparatus for recording and reproducing packet data on and from a recording medium, comprising:

first means for generating time stamps representing moments of arrival of sequentially-inputted packets of data respectively;

second means for adding the time stamps generated by the first means to the sequentially-inputted packets respectively, and thereby converting the sequentially-inputted packets into second packets respectively;

third means for recording the second packets generated by the second means on the recording medium;

fourth means for sequentially reproducing the second packets from the recording medium;

fifth means for detecting the time stamps in the respective second packets reproduced by the fourth means;

sixth means for detecting whether each of the time stamps detected by the fifth means is correct or wrong; and seventh means for, when the sixth means detects a wrong time stamp, generating given information and adding the generated information to a second packet which is reproduced by the fourth means and which relates to the wrong time stamp detected by the sixth means, the added information representing that the time stamp of the related second packet is wrong.

5. The apparatus of claim 4, wherein the sixth means comprises:

means for selecting a plurality of successively-occurring time stamps from among the time stamps detected by the fifth means, the selected time stamps containing a time stamp of interest;

means for comparing the selected time stamps with each other; and means for deciding whether or not the time stamp of interest is correct or wrong in response to a result of the comparison between the selected time stamps.

6. An apparatus for reproducing packet data from a recording medium, comprising:

first means for sequentially reproducing packets of data from the recording medium;

second means for detecting time stamps in the respective packets reproduced by the first means;

third means for detecting whether each of the time stamps detected by the second means is correct or wrong comprising 1) means for selecting a plurality of successively-occurring time stamps from among the time stamps detected by the second means, the selected time stamps containing a time stamp of interest; 2) means for comparing the selected time stamps with each other; and 3) means for deciding whether or not the time stamp of interest is correct or wrong in response to a result of the comparison between the selected time stamps; and fourth means for, when the third means detects a wrong time stamp, discarding a packet which is reproduced by the first means and which relates to the wrong time stamp detected by the third means.

7. The apparatus of claim 6, wherein the fourth means comprises:

a buffer memory for sequentially storing the packets reproduced by the first means, and for sequentially outputting the stored packets; and means for inhibiting the buffer memory from outputting a packet which relates to the wrong time stamp detected by the third means.

8. The apparatus of claim 6, wherein the fourth means comprises a switch connected between the first means and a transmission line and connected to the third means for inhibiting a packet, which is reproduced by the first means and which relates to the wrong time stamp detected by the third means, from traveling to the transmission line.

9. An apparatus for reproducing packet data from a recording medium, comprising:

first means for sequentially reproducing packets of data from the recording medium;

second means for detecting time stamps in the respective packets reproduced by the first means;

third means for detecting whether each of the time stamps detected by the second means is correct or wrong; and fourth means for, when the third means detects a wrong time stamp, generating given information and adding the generated information to a packet which is reproduced by the first means and which relates to the wrong time stamp detected by the third means, the added information representing that the time stamp of the related packet is wrong.

10. The apparatus of claim 9, wherein the third means comprises:

means for selecting a plurality of successively-occurring time stamps from among the time stamps detected by the second means, the selected time stamps containing a time stamp of interest;

means for comparing the selected time stamps with each other; and means for deciding whether or not the time stamp of interest is correct or wrong in response to a result of the comparison between the selected time stamps.

11. An apparatus for recording and reproducing packet data on and from a recording medium, comprising:

a generator for generating time stamps representing moments of arrival of sequentially-inputted packets of data respectively;

an adder for adding the time stamps generated by tile generator to the sequentially-inputted packets respectively, and thereby converting the sequentially-inputted packets into second packets respectively;

a recorder for recording the second packets generated by the adder on the recording medium;

a reproducer for sequentially reproducing the second packets from the recording medium;

a first detector for detecting the time stamps in the respective second packets reproduced by the reproducer;

a second detector for detecting whether each of the time stamps detected by the first detector is correct or wrong comprising 1) a selector for selecting a plurality of successively-occurring time stamps from among the time stamps detected by the first detector, the selected time stamps containing a time stamp of interest; 2) a comparator for comparing the selected time stamps with each other; and 3) a deciding device for deciding whether or not the time stamp of interest is correct or wrong in response to a result of the comparison between the selected time stamps; and a discard device for, when the second detector detects a wrong time stamp, discarding a second packet which is reproduced by the reproducer and which relates to the wrong time stamp detected by the second detector.

12. The apparatus of claim 11, wherein the discard device comprises:

a buffer memory for sequentially storing the second packets reproduced by the reproducer, and for sequentially outputting the stored second packets; and an inhibitor for inhibiting the buffer memory from outputting a second packet which relates to the wrong time stamp detected by the second detector.

13. The apparatus of claim 11, wherein the discard device comprises a switch connected between the reproducer and a transmission line and connected to the second detector for inhibiting a second packet, which is reproduced by the reproducer and which relates to the wrong time stamp detected by the second detector, from traveling to the transmission line.

14. An apparatus for recording and reproducing packet data on and from a recording medium, comprising:

a generator for generating time stamps representing moments of arrival of sequentially-inputted packets of data respectively;

an adder for adding the time stamps generated by the generator to the sequentially-inputted packets respectively, and thereby converting the sequentially-inputted packets into second packets respectively;

a recorder for recording the second packets generated by the adder on the recording medium;

a reproducer for sequentially reproducing the second packets from the recording medium;

a first detector for detecting the time stamps in the respective second packets reproduced by the reproducer;

a second detector for detecting whether each of the time stamps detected by the first detector is correct or wrong; and an information generating and adding device for, when the second detector detects among time stamp, generating given information and adding the generated information to a second packet which is reproduced by the reproducer and which relates to the wrong time stamp detected by the second detector, the added information representing that the time stamp of the related second packet is wrong.

15. The apparatus of claim 14, wherein the second detector comprises:

a selector for selecting a plurality of successively-occurring time stamps from among the time stamps detected by the first detector, the selected time stamps containing a time stamp of interest;

a comparator for comparing the selected time stamps with each other; and a deciding device for deciding whether or not the time stamp of interest is correct or wrong in response to a result of the comparison between the selected time stamps.

16. An apparatus for reproducing packet data from a recording medium, comprising:

a reproducer for sequentially reproducing packets of data from the recording medium;

a first detector for detecting time stamps in the respective packets reproduced by the reproducer;

a second detector for detecting whether each of the time stamps detected by the first detector is correct or wrong comprising 1) a selector for selecting a plurality of successively-occurring time stamps from among the time stamps detected by the first detector, the selected time stamps containing a time stamp of interest; 2) a comparator for comparing the selected time stamps with each other; and 3) a deciding device for deciding whether or not the time stamp of interest is correct or wrong in response to a result of the comparison between the selected time stamps; and a discard device for, when the second detector detects a wrong time stamp, discarding a packet which is reproduced by the reproducer and which relates to the wrong time stamp detected by the second detector.

17. The apparatus of claim 16, wherein the discard device comprises:

a buffer memory for sequentially storing the packets reproduced by the reproducer, and for sequentially outputting the stored packets; and an inhibitor for inhibiting the buffer memory from outputting a packet which relates to the wrong time stamp detected by the second detector.

18. An apparatus of claim 16, wherein the discard device comprises a switch connected between the reproducer and a transmission line and connected to the second detector for inhibiting a packet, which is reproduced by the reproducer and which relates to the wrong time stamp detected by the second detector, from traveling to the transmission line.

19. An apparatus for reproducing packet data from a recording medium, comprising a reproducer for sequentially reproducing packets of data from the recording medium;

a first detector for detecting time stamps in the respective packets reproduced by the reproducer;

a second detector for detecting whether each of the time stamps detected by the first detector is correct or wrong; and an information generating and adding device for, when the second detector detects a wrong time stamp, generating given information and adding the generated information to a packet which is reproduced by the reproducer and which relate to the wrong time stamp detected by the second detector, the added information representing that the time stamp of the related packet is wrong.

20. The apparatus of claim 19, wherein the second detector comprises:

a selector for selecting a plurality of successively-occurring time stamps from among the time stamps detected by the first detector, the selected time stamps containing a time stamp of interest;

a comparator for comparing the selected time stamps with each other; and a deciding device for deciding whether or not the time stamp of interest is correct or wrong in response to a result of the comparison between the selected time stamps.

* * * * *